(No Model.)
W. BALDWIN.
PLASHED FENCE.
No. 263,094. Patented Aug. 22, 1882.
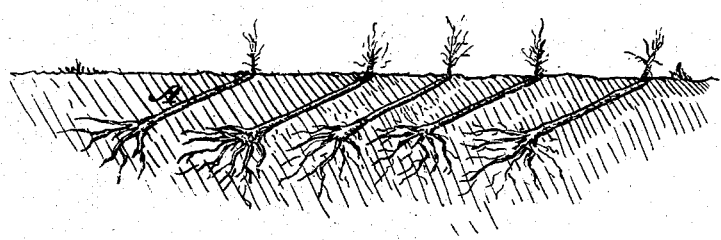
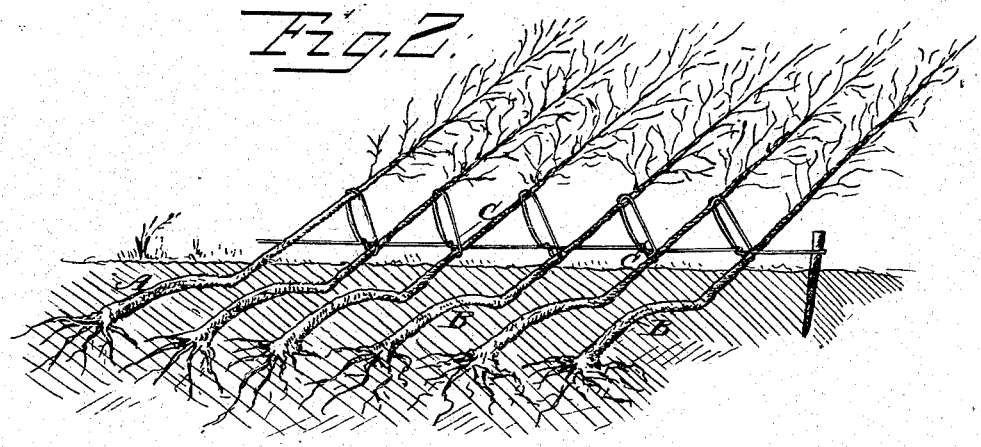
WITNESSES
Franck L. Ourand
N. E. Oliphant
INVENTOR
William Baldwin,
per Chas. H. Fowler,
Attorney

United States Patent Office.

WILLIAM BALDWIN, OF MARION, INDIANA.

PLASHED FENCE.

SPECIFICATION forming part of Letters Patent No. 263,094, dated August 22, 1882.

Application filed April 24, 1882. (No model.)

*To all whom it may concern:*

Be it known that I, WILLIAM BALDWIN, a citizen of the United States, residing at Marion, in the county of Grant and State of Indiana, have invented certain new and useful Improvements in Plashed Fences; and I do hereby declare that the following is a full, clear, and exact description of the same, reference being had to the annexed drawings, making a part of this specification, and to the letters and figures of reference marked thereon.

Figure 1 of the drawings is a view showing the manner of planting the twigs in the ground; Fig. 2, a similar view, showing the manner of bending and plashing.

This invention has relation to that class of plashed hedges in which the twigs are bent down at or near the surface of the ground and held in position by a wire or other flexible fastening wrapped around said twigs.

The invention therefore consists in setting or planting the twigs at an angle of any suitable degree, leaving but little, if any, of the twigs above the surface of the ground, and in removing the dirt from about and around the roots when the twigs are sufficiently grown for plashing and bending the portion of the roots nearest the surface down deeper in the ground, to prevent their freezing or being lifted out by the action of the frost and sun, and afterward fastening the twigs in an angular position with wire or other flexible material, which is continuous and extends from end to end of the fence, and formed in twisted loops, each of which embraces two or more of the inclined twigs, substantially as shown in the drawings, hereinafter described, and claimed.

In the accompanying drawings, A represents the twigs set or planted in the ground at an angle, with but little, if any, of the said twigs left above the surface, as shown in Fig. 1.

The twigs are set or planted at an angle to prevent their freezing, and also the liability of their being lifted out by the alternate freezing and thawing of the ground, as is often the case with twigs set or planted in a vertical position, thereby leaving gaps or vacant places in the hedge, which makes the fence ragged and uneven, while in this instance no vacant places or gaps are left in the line of fence, and the hedge grows even and pleasing to the eye.

When the twigs or plants have grown to a sufficient size for bending and plashing I run a small plow along one side of the fence-line and turn the earth away from that side of the roots. After the plowing I remove the earth from under the roots a sufficient distance from the surface and bend the heel of the roots down, as shown at B, Fig. 2. By bending the heel of the roots as described the stalks, or that portion of the hedge-plants above the surface, are caused to assume an angle of sufficient degree ready for plashing.

The means of plashing I use, and which have fully described in my Patent No. 254,187, granted to me February 28, 1882, consists of a continuous wire or other flexible material extending from one end to the other of the fence and formed into twisted loops, each of which embraces two or more of the inclined twigs, and in this instance I apply the wire or other flexible material at the foot of the hedge, near the surface of the ground, with the twist in the link or loop formed near the bottom of said link or loop, as shown at C, Fig. 2. After the plashing is finished the dirt is plowed back again upon the roots and firmly packed upon their tops, thereby aiding to hold the hedge in proper shape and greatly relieving the strain upon the wire or other flexible material used in plashing, thus preventing the same from cutting the stalks of the hedge-plants.

It will be seen by this method of setting or planting the twigs of hedge-plants that it does away with the possibility of the said twigs being lifted out of the ground by its alternate freezing and thawing during an open winter. This lifting out of the young twigs by the frequent action of the frost and sun has been a source of great annoyance to persons using hedges for fencing, as it would leave vacant places or gaps along the entire line, thus giving to the hedge an uneven and consequently unsightly appearance; and bending the heel of the roots down farther in the ground or some distance below the surface when the twigs are of sufficient growth for plashing not only tends to protect them against varying temperature, but aids to hold the stalks in their angular position and greatly relieves the strain upon the wire or other flexible material, which embraces in twisted loops two or more of the inclined twigs.

The invention not only embraces all the advantages embodied in my former patent, but also the advantages hereinbefore described in planting and setting the twigs previous to being plashed, thus producing a fence of the character named possessing the requisite strength, durability, and firmness.

I am aware that heretofore, in the formation of hedges, the twigs or plants have been planted both in an inclined position and vertically, and that in the latter method of planting the earth has subsequently been removed from around the roots of the plants and the latter bent at an angle near the roots and fastened by suitable means, and the earth then replaced, and I do not claim broadly such method of planting and training as of my invention; but, Having fully described my invention, what I do claim as new, and desire to secure by Letters Patent, is—

1. The method, substantially as described, of constructing plashed hedge-fences, which consists in first setting or planting the twigs at angle, with but little, if any, of the twigs projecting above the surface of the ground, and, when sufficiently grown for plashing, removing the earth from about and around the roots and bending the heel, or that portion of the root nearest the surface, down deeper in the ground, as shown, and afterward plashing the stalks or twigs, or that portion of the hedge-plant above the surface, with wire or cord, substantially as and for the purpose specified.

2. The method, substantially as described, of constructing hedge-fences, which consists in first setting or planting the twigs in the ground at angle, with but little, if any, of the twigs projecting above the surface, and, when sufficiently grown for plashing, removing the earth about and around the roots and bending the heel, or that portion thereof nearest the surface, down deeper in the ground, as shown, and afterward plashing the stalks or twigs, or that portion of the hedge-plant above the surface, with a fastening consisting of a continuous wire or cord extending from end to end of the fence, formed in twisted loops, each of which embraces two or more of said stalks or twigs, substantially as and for the purpose set forth.

In testimony that I claim the above I have hereunto subscribed my name in the presence of two witnesses.

WILLIAM BALDWIN.

Witnesses:
  L. D. BALDWIN,
  THOMAS BENBOW.